United States Patent [19]

Ludwig

[11] 4,307,954
[45] Dec. 29, 1981

[54] BAYONET MOUNT

[76] Inventor: Robert B. Ludwig, 172 Sterling Ave., Buffalo, N.Y. 14216

[21] Appl. No.: 179,099

[22] Filed: Aug. 18, 1980

[51] Int. Cl.³ .......................................... G03B 17/00
[52] U.S. Cl. ..................... 354/286; 350/257
[58] Field of Search ............... 354/286; 350/252, 257

[56] References Cited

U.S. PATENT DOCUMENTS

| | | | |
|---|---|---|---|
| 2,260,991 | 10/1941 | Gorey | 350/257 |
| 2,618,201 | 11/1952 | Bröhl et al. | 354/286 |
| 3,529,525 | 9/1970 | Yamashita | 354/286 |
| 4,063,264 | 12/1977 | Ando et al. | 354/286 |
| 4,118,713 | 10/1978 | Murakami et al. | 354/286 X |

*Primary Examiner*—Donald A. Griffin
*Attorney, Agent, or Firm*—Sommer & Sommer

[57] ABSTRACT

An improved bayonet mount is employed to removably mount a lens on the body of a camera. The body has an opening adapted to receive axial insertion of a marginal portion of the lens. A plurality of circumferentially-spaced slots extend radially into said body from said opening. A corresponding plurality of similarly-spaced claws are mounted on the lens marginal portion. The claws and slots are cooperatively configured so as to permit the lens marginal portion to be axially inserted into the opening only when the lens is angularly aligned relative to the body opening, and to prevent any claw from entering the wrong slot in the event that the angular alignment is incorrect.

5 Claims, 4 Drawing Figures

U.S. Patent     Dec. 29, 1981     4,307,954
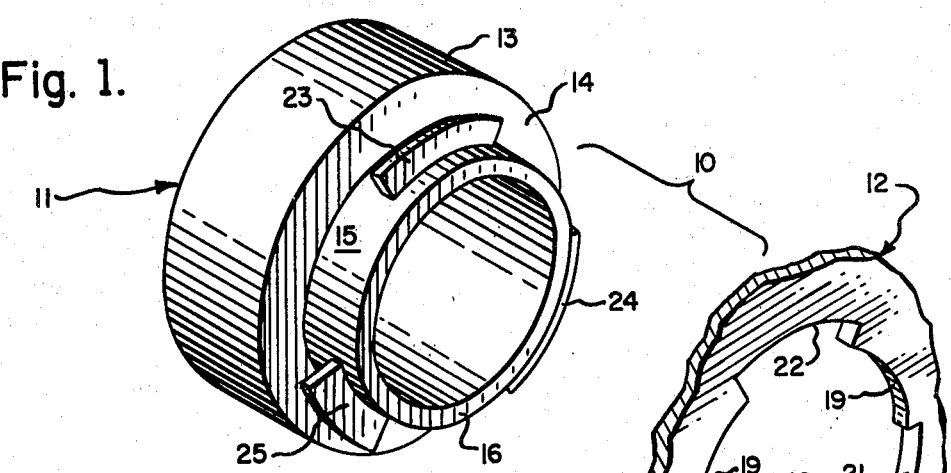
Fig. 1.
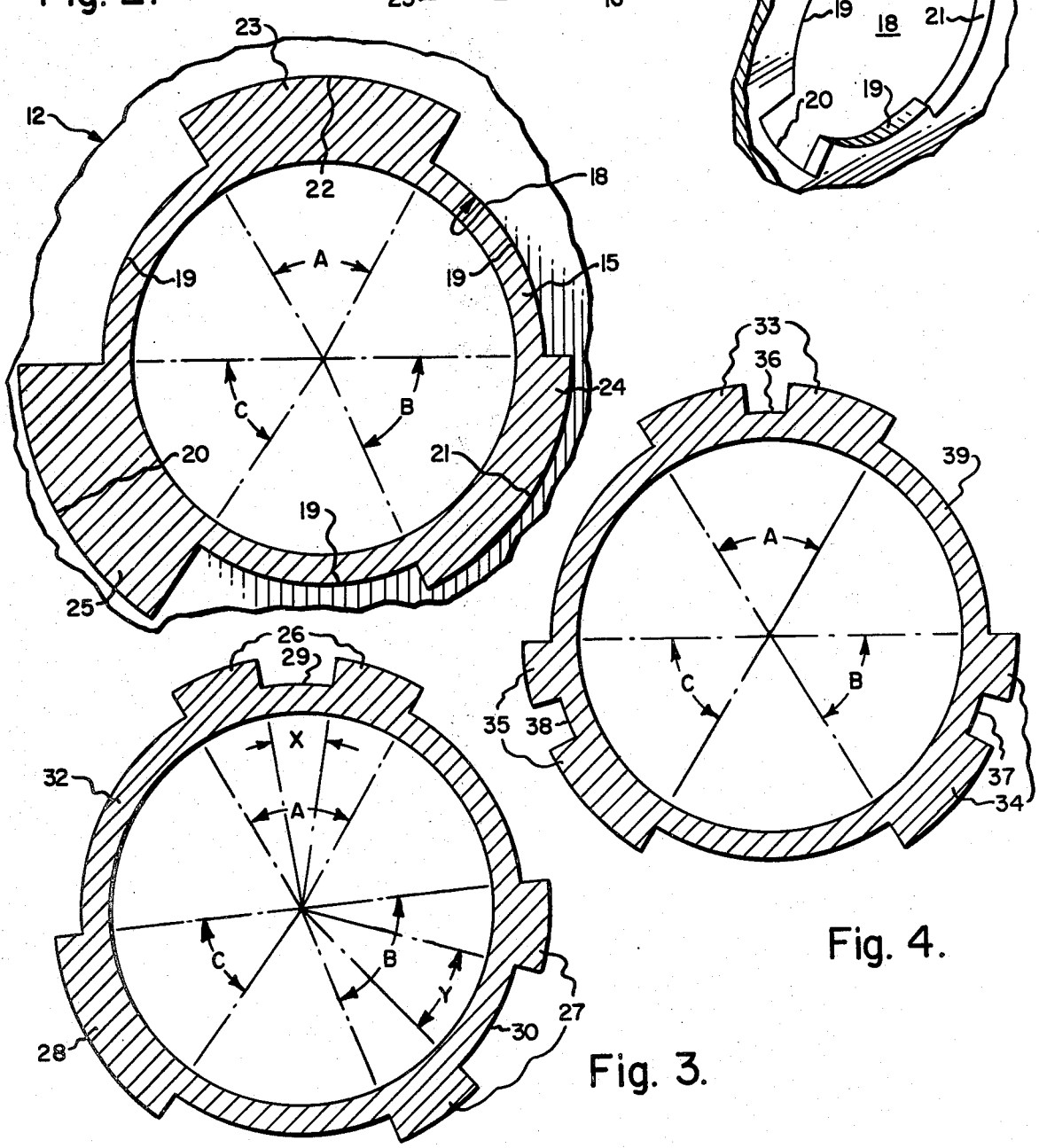
Fig. 2.
Fig. 3.
Fig. 4.

BAYONET MOUNT

BACKGROUND OF THE INVENTION

1. Field of the Invention

The present invention relates generally to the field of bayonet mounts, and more particularly to an improved bayonet mount for quickly and releasably mounting a lens on a camera body.

2. Description of the Prior Art

Bayonet mounts are, of course well known, and have heretofore been specifically employed in the camera art to mount a lens on a camera body. Examples of such known forms of bayonet mounts are representatively shown in U.S. Pat. Nos. 2,618,201; 4,063,264; and 4,118,713.

Such known bayonet mounts have included a plurality of claws mounted on a marginal portion or a lens, for insertion into a camera body opening provided with a correspondingly plurality of claw-receiving slots or recesses. However, these earlier forms have, upon information and belief, generally contemplated that the claws and slots be of uniform height, width and spacing. While providing an operable bayonet mount, this configuration has permitted the lens to be inserted at any angular position at which the symmetrical claws would be aligned with the cooperative symmetrical slots. For example, if there were three claws spaced equally at nominal centerline angles of 120 degrees, the lens could be inserted at any of three angular positions.

To avoid this, it is also known to provide a nonsymmetrical tooth or tab and slot to positively require that the lens be in a predetermined angular position prior to insertion. Such structure is typically shown in the aforesaid U.S. Pat. No. 2,618,201. While this arrangement prevented the lens from being entirely attached in an incorrect angular orientation, it was still possible to insert some of the claws of a misaligned lens through some of the wrong slots. In such misaligned condition, part of the lens marginal portion could pass through the opening. This resulted in the lens being not fully inserted and tilted relative to the axis of the lens and body opening. In such a position, some of the claws have passed through the opening and some have not. The installer is therefore prevented from rotating the lens to its correct angular position for insertion without first withdrawing it fully from the body opening, and rotating it before attempting once again to insert it into the camera body opening.

In order to avoid the above mentioned problem, it is presently necessary that a lens have the correct angular alignment with the body opening before an attempt is made to insert it. Currently, many lens/body combinations have an index on the lens and a corresponding index on the body so that the installer may begin proper insertion of a lens by first aligning the indices. A refinement of this method is for the indices of the lens and body to be raised, or depressed, or identified in such a way that the installer can "feel" them and thus begin installation correctly by tactile means rather than visual means. (See, e.g., U.S. Pat. No. 2,618,201)

SUMMARY OF THE INVENTION

The present invention provides an improved bayonet mount for releasably mounting a lens on the body of a camera, and which facilitates the insertion of the lens by making it unnecessary to angularly align the lens by tactile or visual means before beginning insertion. In fact, no angular alignment at all is needed before beginning insertion. It is only necessary to begin insertion of the lens into the body opening, and, if the angular alignment is incorrect, then the installer can rotate the lens until such correct alignment is attained. In this manner, no part of the lens marginal portion will enter the body opening until correct angular alignment is attained, at which time the entire lens marginal portion will enter the opening. The lens mounting is then completed by a further rotation of the lens as is the case with existing designs.

Therefore, the invention broadly comprises an opening in the body adapted to receive axial insertion of a marginal portion of the lens; a plurality of circumferentially-spaced slots extending, preferably radially, into the body from the opening; and a corresponding plurality of circumferentially-spaced claws provided on the lens marginal portion. The claws and slots are complementarily configured so as to permit the lens marginal portion to be axially inserted into the opening only when the claws are angularly aligned with their cooperative slots. The configuration further prevents the lens from tilting off axis as a result of a claw entering an incorrect slot due to angular misalignment of the lens relative to the body opening, thereby preventing rotation of the lens to the correct angular position without first fully removing the lens from the body.

Accordingly, the general object of the present invention is to provide an improved bayonet mount for quickly and releasably mounting a lens on a camera body.

Another object is to provide an improved bayonet mount which does not require that the lens be angularly oriented relative to the camera body prior to the beginning of insertion.

Still another object is to provide an improved bayonet mount which requires that the lens be angularly oriented relative to the camera body prior to the completion of insertion.

These and other objects and advantages will become apparent from the foregoing and ongoing written specification, the drawings, and the appended claims.

BRIEF DESCRIPTION OF THE DRAWINGS

FIG. 1 is an exploded perspective view of a camera lens aligned with the camera body opening prior to axial insertion.

FIG. 2 is an enlarged fragmentary transverse vertical sectional view of the lens claws aligned with the corresponding slots during such axial insertion.

FIG. 3 is a fragmentary transverse vertical sectional view of a second embodiment, this view being taken through the lens in the plane of the claws but omitting the camera body.

FIG. 4 is a fragmentary transverse vertical sectional view of a third embodiment, this view being taken through the lens in the plane of the claws but omitting the camera body.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the drawings, and more particularly to FIG. 1 thereof, the invention provides a unique improvement in a bayonet-type mount, generally indicated at 10, by which a lens 11 or some other object may be quickly and removably mounted on a camera body, of which a wall portion is indicated at 12. In this regard, the structure shown in the accompanying drawings is somewhat abbreviated so as to focus on the specific improvements and not obfuscate the invention with unnecessary structural details of either the lens or the camera. Suffice it to say that the term "lens" is intended in a broad generic sense as including many different types and sizes of lenses. Similarly, the term "body" is also intended generically.

The particular lens 11 shown in the drawings has a forward cylindrical portion 13, a rearwardly-facing annular vertical shoulder 14, and a cylindrical tubular collar 15 extending rearwardly therefrom to terminate in an annular vertical rear end face 16.

The camera body wall 12 is shown as being provided with a through-opening 18 bounded or bracketed by three discrete circumferentially-spaced cylindrically-segmented surfaces, severally indicated at 19.

FIRST EMBODIMENT (FIGS. 1 and 2)

In the first embodiment depicted in FIGS. 1 and 2, the improvement includes three slots 20, 21, 22 which extend radially into the body member from the opening 18. These slots separate the opening's three cylindrical segments 19. As best shown in FIG. 2, the circumferential width of slot 22 occupies an arc distance A less than the circumferential width of slot 21 (occupying an arc distance B), but greater than the circumferential width of slot 20 (occupying an arc distance C). In addition to having different circumferential widths, slots 20, 21, and 22 also have different radial heights, but in inverse order. Thus the radius of slot 22 is greater than the radius of slot 21, but less than the radius of slot 20. As shown, the radius of slot 21 is the radius of the segments 19 plus one unit; the radius of slot 22 is the radius of segments 19 plus two units; and the radius of slot 20 is the radius of segments 19 plus three units.

Adverting to FIG. 1, three claws 23, 24 and 25 are shown mounted on the lens marginal portion 15 and spaced forwardly in an axial direction of rear end face 16. The claws are configured complementarily with the slots so as to permit the claws to be axially inserted through the slots only when the claws are angularly aligned with the cooperative slots. Claw 24 occupies an arc distance and has a radial height equal respectively to those of its mating body slot 21; claw 25 occupies an arc distance and has a radial height equal respectively to those of its mating body slot 20; and claw 23 occupies an arc distance and has a radial height equal respectively to those of its mating body slot 22. Claws 23 and 24 are of course separated by an arc distance equal to that of the separation between body slots 22 and 21; claws 24 and 25 are separated by an arc distance equal to that of the separation between body slots 21 and 20; and claws 25 and 23 are separated by an arc distance equal to that of the separation between body slots 20 and 22. The foregoing spacing of the claws and slots is only nominal. Obviously, there must be some clearance between so as to facilitate insertion and removal of the claws from the slots. Hence, the above angles and radii should be slightly modified so as to afford sufficient clearance.

Thus, the lens must be rotatively oriented to a desired position, at which each claw is axially aligned with its cooperative slot, prior to insertion of the lens marginal portion through the opening. At the same time, the cooperative configuration between the claws and slots will prevent any portion of the marginal portion of the lens from entering or passing through the body opening if the lens is not correctly angularly oriented. It is physically impossible for one claw to be inserted through a misaligned slot. All the operator need do to mount the lens is to place the lens marginal portion in axial alignment with the body opening and then rotate the lens until the claws are angularly aligned with the proper slots. Once so oriented, the operator may then axially insert the lens marginal portion through the body opening and then complete the locking manipulation. The operator may readily accomplish the foregoing without the use of any visual or tactile aid to determine the correct angular position of the lens for proper insertion.

SECOND EMBODIMENT (FIG. 3)

Referring now to FIG. 3, a second embodiment of the improved bayonet mount is shown as having its cooperative claws and slots again of varying circumferential width, but with substantially the same radial height. To accomplish the desired result that no claw can enter any slot other than its intended receiver, some claws have a notch cut out of their respective centers and the body opening has corresponding cooperative tabs. Here the advantageous configuration is provided by the relationships between the circumferential width of the respective claws and notches. For the sake of convenience, only the claw width and notch width will be explicitly described, it being understood that the slots and tabs are similarly configured, allowing for a slight clearance.

In this second embodiment, three claws 26, 27, and 28 are mounted on the lens marginal portion 33. Two of these three claws each contain a notch cut into the outside circumference according to the following configuration. Claw 26 (occupying arc distance A), having smaller circumferential width than that of claw 27 (occupying arc distance B), has a notch 29 (occupying arc distance X) of smaller circumferential width than that of notch 30 (occupying arc distance Y) in claw 27. As shown in FIG. 3, claw 28 (occupying arc distance C) is of smaller circumferential width than that of claw 26, and has no notch in it at all. A notch in claw 28 is optional; but if it is included, then it must be of smaller circumferential width than that of notch 29 in claw 26. A further requirement is that claw 28 must have circumferential width greater than that of the part of either claw 26 or claw 27 to one side of its respective notch. The following relationships must be maintained with reference to FIG. 3. Assuming that angle C is less than angle A, which in turn is less than angle B, the following must hold.

(i) Angle X is less than angle Y.
(ii) Angle C is greater than $\frac{1}{2}$ (angle A − angle X).
(iii) Angle C is greater than $\frac{1}{2}$ (angle B − angle Y).
(iv) If claw 28 has a notch, then its circumferential width is less than angle X.

THIRD EMBODIMENT (FIG. 4)

The third embodiment differs from the second embodiment in that the width of all claws is the same. Each of the three claws again has a notch cut into its outer circumference and the body mount would of course have corresponding tabs.

The desired result, that no claw can enter any slot, other than its intended receiver, is here accomplished by having the notches cut at varying places in relation to the center of their respective claws. Thus, claw 33 has a notch 36 in its center, while claw 34 has a notch 37 off center in a counterclockwise direction, and claw 35 has a notch 38 off center in a clockwise direction around the circumference of the lens mount.

The portion of the cylindrical tabular collar 15 which extends rearward beyond the most rearward part of the attached claws is an option. Without this additional rearward projection, the aims of the invention are still met, resulting in considerable improvement in the ease with which the lens is mounted to the camera. The additional extension, however, if the camera body allows sufficient clearance for its inclusion, aids the operator in axially centering the lens in the body opening at the beginning of the mounting process. An alternative to this collar extension, which would serve as a centering device, would be a ring on the outside of the body, encircling the body opening in such a way that the outside circumference of the lens itself would just fit inside the aforementioned ring.

A second alternative to the collar extension which would be usable for any lens embodiment which contained claws all having the same radial height, would be to provide for a depression about the body opening in such a way that the claws of the lens would just fit into the depression as lens insertion was begun and before correct angular orientation was achieved.

In each of the three disclosed embodiments, the claws and slots are configured so as to permit axial insertion and removal at only one angular position of the lens relative to the camera body. Each embodiment is configured such that no claw can be inserted through any slot other than its intended receiver, and thus no off-axis tilting of the lens can occur which would impede the operator from rotating the lens until correct angular alignment has been attained.

As previously mentioned, the various heights, widths, and spacings of the claws, slots, notches, and tabs should afford a measure of clearance for ease of lens mounting. The three embodiments herein disclosed are illustrative, and are not the only embodiments upon which the claims are intended to read. Many modifications and combinations of these embodiments are contemplated by the inventor.

Therefore while several preferred embodiments have been shown and described, persons skilled in the art will readily appreciate that such additional modifications and combinations may be made without departing from the spirit of the invention, as defined by the following claims.

What is claimed is:

1. In a bayonet mount arranged to removably mount a lens on the body of a camera, the improvement which comprises:

an opening in said body adapted to receive axial insertion of a marginal portion of said lens,
a plurality of circumferentially-spaced slots extending into said body from said opening;
a corresponding plurality of circumferentially-spaced claws provided on said lens marginal portion;
said claws and slots being cooperatively configured so as to permit said marginal portion to be axially inserted into said opening only when said claws are angularly aligned with said slots, and to prevent any portion of said marginal portion from tilting into said opening when said lens is angularly misaligned;
whereby said lens must be angularly aligned with said opening prior to insertion of said marginal portion through said opening.

2. The improvement as set forth in claim 1 wherein each of said claws has a different radial height.

3. The improvement as set forth in claim 2 wherein each of said claws occupies a different circumferential width.

4. The improvement as set forth in claim 1 wherein each of said claws is of the same radial height.

5. The improvement as set forth in claim 4 wherein said claws occupy different circumferential widths.

* * * * *